3,171,851
AMINO METHYLPHENYL SILICON
COMPOUNDS
Enrico J. Pepe, Kenmore, N.Y., assignor to Union
Carbide Corporation, a corporation of New York
No Drawing. Filed Dec. 6, 1961, Ser. No. 157,590
17 Claims. (Cl. 260—448.2)

This application is a continuation-in-part of application Serial No. 801,700, filed March 25, 1959, now abandoned.

This invention relates to organosilicon compounds and processes for their production. More particularly, this invention provides silanes and siloxanes containing a silicon-bonded aminomethylphenyl or aminomethylphenylalkyl group (i.e. a group having the formula $$Z_2NCH_2C_6H_4C_nH_{2n}-$$

where Z is a monovalent hydrocarbon group, or preferably, a hydrogen atom and $n$ has a value from 0 to 20 inclusive). This invention further provides a process for producing such silanes and siloxanes which involves hydrogenating the cyano group of a silane or a siloxane containing a silicon-bonded cyanophenyl or cyanophenylalkyl group to produce a primary amine of this invention and, when a secondary or tertiary amine of this invention is desired, converting the primary amine to a secondary or tertiary amine.

The silanes of this invention are represented by the formula:

$$(Z_2NCH_2C_6H_4C_nH_{2n})_a\overset{R_b}{\underset{|}{Si}}(OR)_{4-(a+b)} \qquad (1)$$

wherein Z is a monovalent hydrocarbon group or a hydrogen atom, $n$ has a value from 0 to 20 inclusive, R is a monovalent hydrocarbon group, $a$ has a value of 1 or 2, $b$ has a value from 0 to 2 and $(a+b)$ has a value from 1 to 3. Illustrative of the monovalent hydrocarbon groups represented by Z and R in Formula 1 are the alkyl groups (e.g. the methyl, ethyl and propyl groups), the aryl groups (e.g. the phenyl groups) and the aralkyl groups (e.g. the benzyl and beta-phenylethyl groups). These monovalent hydrocarbon groups preferably contain from 1 to 18 carbon atoms. In Formula 1, Z can represent the same or different groups and R can represent the same or different groups. In Formula 1, Z is preferably a hydrogen atom and $n$ preferably has a value from 0 to 5 inclusive.

Preferred classes of silanes of this invention are those represented by the formulae:

$$H_2NCH_2C_6H_4\overset{(CH_3)_b}{\underset{|}{Si}}(OC_2H_5)_{3-b} \qquad (2a)$$

and $$H_2NCH_2C_6H_4CH_2CH_2\overset{(CH_3)_b}{\underset{|}{Si}}(OC_2H_5)_{3-b} \qquad (2b)$$

wherein $b$ has a value from 0 to 2.

Illustrative of the silanes of this invention are p-aminomethylphenyltriethoxysilane, p - aminomethylphenyl-(methyl) diethoxysilane, p-aminomethylphenyldimethylethoxysilane, N - methyl-p-aminomethylphenyltriethoxysilane, N-methyl-N-phenyl-p-aminomethylphenyl(phenyl) diphenoxysilane, m - aminomethylphenyltriethoxysilane, m-aminomethylphenyl(methyl)diethoxysilane, m-aminomethylphenyldimethyl(ethoxy)silane, di(m-aminomethylphenyl)dipropoxysilane, p-aminomethylphenylmethyltriethoxysilane [i.e. p-$H_2NCH_2C_6H_4CH_2Si(OC_2H_5)_3$], beta-(p-aminomethylphenyl)ethyltriethoxysilane [i.e.

p-$H_2NCH_2C_6H_4CH_2CH_2Si(OC_2H_5)_3$]

gamma(p-aminomethylphenyl)propyltriethoxysilane [i.e. $H_2NCH_2C_6H_4CH_2CH_2CH_2Si(OC_2H_5)_3$] and the like.

The siloxanes of this invention contain at least one group that is represented by the formula:

$$(Z_2NCH_2C_6H_4C_nH_{2n})_a\overset{R_b'}{\underset{|}{Si}}O_{\frac{4-(a+b)}{2}} \qquad (3)$$

wherein R' is a monovalent hydrocarbon group [i.e. a group represented by R by Formula 1] or a hydrocarbonoxy group [i.e. an OR group where R has the meaning defined for Formula 1] and $n$, Z, $a$, $b$ and $(a+b)$ have the meanings defined for Formula 1. In Formula 3, Z is preferably a hydrogen atom. Illustrative of the hydrocarbonoxy groups represented by R' are the alkoxy groups (e.g. the methoxy, ethoxy and propoxy groups) and the aryloxy groups (e.g. the phenoxy group). These siloxanes can have linear cyclic or branched structures.

Illustrative of the siloxane groups represented by Formula 3 are the p-aminomethylphenylsiloxy, p-aminomethylphenyl(ethoxy)siloxy, p - aminomethylphenyl-(methyl)siloxy, p-aminomethylphenyldimethylsiloxy, N-methyl-p-aminomethylphenylsiloxy, N-methyl-N-phenyl-p - aminomethylphenyl(phenyl)siloxy, m - aminomethylphenylsiloxy, m-aminomethylphenyl(ethoxy)siloxy, m-aminomethylphenyl(methyl)siloxy, m-aminomethylphenyldimethylsiloxy, m-aminomethylphenyl(methyl)ethoxysiloxy, di(m-aminomethylphenyl)siloxy groups, p-aminomethylphenylmethylsiloxy [i.e.

p-$H_2NCH_2C_6H_4CH_2SiO_{1.5}$]

beta(p-aminomethylphenyl(ethylsiloxy [i.e.

p-$H_2NCH_2C_6H_4CH_2CH_2SiO_{1.5}$]

gamma(p-aminomethylphenyl)propylsiloxy [i.e.

$H_2NCH_2C_6H_4CH_2CH_2CH_2SiO_{1.5}$]

and the like.

Preferred classes of siloxanes of this invention contain at least one group represented by the formula:

$$H_2NCH_2C_6H_4\overset{R_b^2}{\underset{|}{Si}}O_{\frac{3-b}{2}} \qquad (4a)$$

or $$H_2NCH_2C_6H_4CH_2CH_2\overset{R_b^2}{\underset{|}{Si}}O_{\frac{3-b}{2}} \qquad (4b)$$

wherein $R^2$ is a methyl group or an ethoxy group and $b$ has a value from 0 to 2. In Formula 4a or 4b, $R^2$ can represent the same or different groups.

The siloxanes of this invention include those which contain, in addition to at least one group represented by Formula 3, at least one group represented by the formula:

$$R_c'SiO_{\frac{4-c}{2}} \qquad (5)$$

wherein R' has the meaning defined for Formula 3 and $c$ has a value for from 0 to 3. Preferably at least one group represented by R' in Formula 5 is a monovalent hydrocarbon group. In Formula 5, R' can represent the same or different groups. Illustrative of the groups represented by Formula 5 are the methylsiloxy, methyl(ethoxy)siloxy, dimethylsiloxy, trimethylsiloxy, phenylsiloxy, phenyl(ethoxy)siloxy, diphenylsiloxy, triphenylsiloxy, beta-phenylethylsiloxy, diethylsiloxy, ethyl(methyl)siloxy and phenyl(methyl)siloxy groups and the like.

The primary amines of this invention (i.e. the silanes depicted by Formula 1 wherein $Z_2$ represents two hydrogen atoms and the siloxanes containing at least one group depicted by Formula 3 wherein $Z_2$ represents two hydrogen atoms) are produced by hydrogenating silanes and siloxanes containing silicon-bonded cyanophenyl or cyanophenylalkyl groups.

Silanes which are suitable starting materials in producing silanes depicted by Formula 1 wherein $Z_2$ represents two hydrogen atoms having the formula:

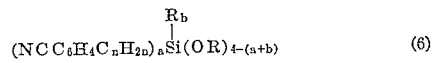  (6)

wherein $n$, R, $a$, $b$ and $(a+b)$ have the meanings defined for Formula 1. Illustrative of these cyanophenylhydrocarbonoxysilanes are p-cyanophenyltriethoxysilane,
p-cyanophenyl(methyl)diethoxysilane,
p-cyanophenyldimethylethoxysilane,
m-cyanophenyltriethoxysilane,
m-cyanophenyl(methyl)diethoxysilane,
m-cyanophenyldimethyl(ethoxy)silane,
m-cyanophenyl(phenyl)diphenoxysilane,
p-cyanophenylmethyltriethoxysilane,
beta(p-cyanophenyl)ethyltriethoxysilane,
gamma(p-cyanophenyl)propyltriethoxysilane, and the like.

Starting silanes that are suitable for use in producing silanes depicted by Formula 2a and 2b are more specifically represented by the formulae:

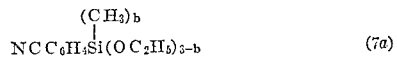  (7a)

and

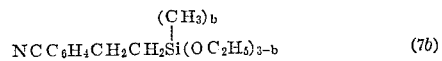  (7b)

wherein $b$ has a value from 0 to 2.

Siloxanes which are suitable starting materials in producing siloxanes that contain at least one group depicted by Formula 3 wherein $Z_2$ represents two hydrogen atoms contain at least one group having the formula:

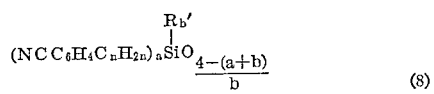  (8)

wherein $n$, R', $a$, $b$ and $(a+b)$ have the meanings defined for Formula 3. Illustrative of these cyanophenylsiloxy groups are the p-cyanophenylsiloxy,
p-cyanophenyl(methyl)siloxy,
p-cyanophenyldimethylsiloxy,
p-cyanophenyl(ethoxy)siloxy,
p-cyanophenylmethyl(ethoxy)siloxy,
m-cyanophenylsiloxy,
m-cyanophenyl(methyl)siloxy,
m-cyanophenyldimethylsiloxy,
m-cyanophenyl(ethoxy)siloxy,
m-cyanophenyl(methyl)-(ethoxy)siloxy,
p-cyanophenylmethylsiloxy,
beta(p-cyanophenyl)ethylsiloxy, and
gamma(p-cyanophenyl)propylsiloxy groups and the like.

Starting siloxanes that are suitable in producing siloxanes containing at least one group depicted by Formula 4a or 4b contain at least one group that is more specifically represented by the formula:

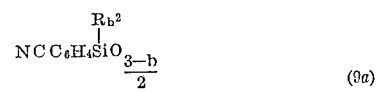  (9a)

or

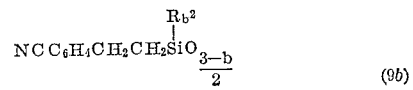  (9b)

wherein R and $b$ have the meanings defined for Formulae 4a and 4b.

The starting siloxanes which contain at least one group represented by Formula 8 can also contain at least one group represented by Formula 5.

The starting cyanophenylhydrocarbonoxysilanes and cyanophenylalkylhydrocarbonoxysilanes used in producing the primary amines of this invention of the silane type are produced by a process that involves reacting an alkali metal cyanide (e.g. sodium cyanide) and a bromophenylhydrocarbonoxysilane (e.g. p-bromophenyltriethoxysilane) or a bromophenylalkylhydrocarbonoxysilane (e.g. beta(p-bromophenyl)ethyltriethoxysilane) within a highly polar liquid organic compound (e.g. diethylformamide). The reaction is conducted at temperatures from 25° C. to 250° C., in the presence of cuprous cyanide and copper and, preferably, under anhydrous conditions. Suitable starting cyanophenylhydrocarbonoxysilanes and processes for their production are disclosed in United States Patent 2,975,204.

The starting siloxanes used in producing the primary amines of this invention of the siloxane type are produced by hydrolysis and condensing cyanophenylhydrocarbonoxysilanes (e.g. p-cyanophenyltriethoxysilane) or cyanophenylalkylhydrocarbonoxysilanes (e.g. beta(p-cyanophenyl)ethyltriethoxysilane). The hydrolysis and condensation can be conducted at temperatures from 0° C. to 100° C., within a solvent (e.g. benzene) and in the presence of an acidic catalyst (e.g. hydrochloric acid) or a basic catalyst (e.g. sodium hydroxide). Other hydrocarbonoxysilanes (e.g. dimethyldiethoxysilane) can be cohydrolyzed and cocondensed with these cyanophenylhydrocarbonoxysilanes to produce starting siloxanes containing both groups represented by Formulae 5 and 8. Suitable starting siloxanes and processes for their production are disclosed and claimed in United States Patent 2,975,154.

The primary amines of this invention are produced by a hydrogenation reaction that can be represented by the equation:

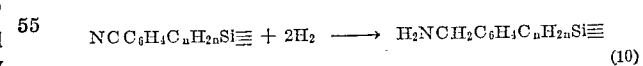  (10)

wherein $n$ has the above-defined meaning.

The relative amount of the reactants used in the reaction represented by Equation 10 is not narrowly critical. In general, it is desirable to employ an excess of hydrogen. Amounts of hydrogen from 2 to 20 times the amount stoichiometrically required by Equation 10 are particularly useful.

The reaction represented by Equation 10 is preferably conducted within a closed pressure vessel in which a superatmospheric pressure is maintained by charging hydrogen. Under these conditions particularly good reaction rates are obtained. Suitable hydrogen pressures are from 1500 p.s.i. and 2000 p.s.i.

The reaction represented by Equation 10 can be conducted at temperatures from 80° C. to 140° C. for from 2 hours to 8 hours. The time required is generally inversely proportional to the temperature employed.

Catalysts can be advantageously employed in the reaction represented by Equation 10. Suitable catalysts include platinum and palladium which can be used alone or supported from a material such as the gamma-allotrope of alumina or charcoal. Other useful catalysts include nickel (e.g. Raney nickel), cobalt (e.g. Raney cobalt), and cyclopentadienyl metal compounds (e.g. bis-(cyclopentadienyl) nickel). Amounts of catalyst from 0.5 part to 10 parts by weight per 100 parts by weight of the starting cyanophenylsilicon compound are desirable.

The reaction represented by Equation 10 can be conducted within a liquid organic compound (i.e. solvent) in which the starting materials are mutually soluble and with which they are non-reactive. Suitable solvents include alcohols (e.g. methanol and ethanol) and aromatic hydrocarbons (e.g. toluene and benzene). From about 50 parts to 500 parts by weight of the solvent per 100 parts by weight of the starting cyanophenylsilicon or cyanophenylalkylsilicon compound can be employed. The primary amines of this invention are usually soluble in these solvents and can be separated therefrom, if desired, by suitable means e.g. by distillation.

The particular conditions employed in the reaction represented by Equation 10 [e.g. amounts of reactants, pressure, reaction time, reaction temperature, amount of catalyst and amount of solvent] are generally not critical. However, no commensurate advantage is gained by employing conditions other than those indicated above.

The primary amines of this invention can be converted to secondary and tertiary amines by conventional processes which involve reacting the primary amines with a compound capable of replacing one or both of the nitrogen-bonded hydrogen atoms of the primary amine by monovalent hydrocarbon groups. Suitable compounds that can be reacted with these primary amines to produce secondary and tertiary amines include hydrocarbyl halides (e.g. methyl iodide and methyl bromide) and dihydrocarbyl sulfates (e.g. dimethyl sulfate).

The amines of this invention of the siloxane type can also be produced by hydrolyzing and condensing the amines of this invention of the silane type. This hydrolysis and condensation of these silanes is conveniently conducted according to the above-described procedure used in hydrolyzing and condensing cyanophenylhydrocarbonoxysilanes or cyanophenylalkylhydrocarbonoxysilanes. Hydrocarbonhydrocarbonoxysilanes (e.g. dimethyldiethoxysilane) can be cohydrolyzed and cocondensed with the amines of this invention of the silane type to produce siloxanes containing groups represented by Formula 5 as well as groups represented by Formula 3 where $Z_2$ represents two hydrogen atoms.

The compounds of this invention can be added to water and aqueous solutions to provide good corrosion inhibition for metals and alloys (i.e. magnesium and the metals below magnesium in the electromotive series and alloys thereof) that come in contact with the water or the aqueous solutions.

The compounds of this invention are also useful as lubricating oils, sequestering agents and in forming protective coating for metals.

The following examples illustrate the present invention:

*Example I*

Into a 300 ml. stainless steel pressure vessel were charged 70 g. (0.25 mole) of p-cyanophenyltriethoxysilane dissolved in 70 ml. of ethanol and 3 g. of Raney nickel. The vessel was heated at 100° C. to 125° C. for 3 hours. A pressure of 1700 p.s.i. was maintained in the vessel by charging hydrogen thereto. The contents of the vessel were filtered and the filtrate was distilled under vacuum. The fraction distilling at 119° C. at 0.6 mm. of Hg was identified as p-aminomethylphenyltriethoxysilane [$n_D^{21}$ 1.4839]. The latter compound was found to have a neutralization equivalent of 273 (theoretical 269.3) and gave the following elemental analysis:

| | C (wt.-percent) | H (wt.-percent) | N (wt.-percent) | Si (wt.-percent) | $OC_2H_5$ (wt.-percent) |
|---|---|---|---|---|---|
| Calculated (for $C_{13}H_{24}NSiO_3$) | 57.8 | 8.89 | 5.13 | 10.38 | 50.0 |
| Found | 57.7 | 9.1 | 4.9 | 12.0 | 48.9 |

*Example II*

Into a 300 ml. stainless steel pressure vessel were charged 137 g. (0.5 mole) of m-cyanophenyltriethoxysilane, 6.8 g. of a mixture of nickel and nickel oxide supported on kieselguhr and 25 ml. of ethanol. The vessel was purged with nitrogen and charged with hydrogen to a pressure of 1900 p.s.i. The reactants were heated to 80° C. to initiate the reaction and thereafter the temperature was maintained at 100° C. for two hours. The contents of the vessel were cooled and filtered and the filtrate was stripped. The residue was fractionally distilled under vacuum. The fraction distilling at 104° C.–105° C. at 0.4 mm. of Hg was identified as m-aminomethylphenyltriethoxysilane [$n_D^{25}$ 1.4831]. The latter compound was found to have a neutralization equivalent of 269.0 (theoretical 269.3). The yield of this silane was 45.4%.

*Example III*

Meta-aminomethylphenyltriethoxysilane (5 g.) was hydrolyzed and condensed in a solution containing water (5 ml.) and ethanol (15 ml.). The yellow solution so produced was stripped of water and ethanol by heating at 50° C. under reduced pressure. The residue was a yellow solid which was a siloxane composed of groups having the formula: m-$H_2NCH_2C_6H_4SiO_{1.5}$.

*Example IV*

Two of the compounds of this invention

[m-$H_2NCH_2C_6H_4Si(OC_2H_5)_3$ and p-$H_2NCH_2C_6H_4(OC_2H_5)_3$] were tested as corrosion inhibitors for iron in an aqueous ethylene glycol solution such as is commonly employed as a coolant in internal combustion engines. One part by weight of indicated compounds per 100 parts by weight of the aqueous glycol solution was used. To make the test more severe, the solutions were aerated, heated at 180° F. for 200 hours and contained 100 parts per million each of chloride, sulfate, and bicarbonate ions. The iron specimens were cleaned prior to the test and scoured after the test. The loss of weight of the iron specimen is taken as a measure of corrosion. For reference purposes, the corrosion observed when the two other aminohydrocarbylsilanes [i.e. $H_2NC_6H_4Si(OC_2H_5)_3$ and

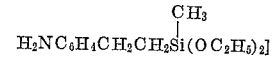

were used as inhibitors and when no inhibitor is used are given. The weight losses given are the average of two runs.

| Inhibitor | Weight Loss of Iron Specimen (milligrams) |
|---|---|
| m-$H_2NCH_2C_6H_4Si(OC_2H_5)_3$ | 38 |
| p-$H_2NCH_2C_6H_4Si(OC_2H_5)_3$ | 72 |
| $H_2NC_6H_4CH_2CH_2Si(OC_2H_5)_2$ with $CH_3$ | 439 |
| $H_2NC_6H_4Si(OC_2H_5)_3$ | 575 |
| None | 1,739 |

The results show the superior corrosion protection for iron obtained with compounds of this invention.

Example V

Two of the compounds of this invention were tested as corrosion inhibitors for aluminum, brass and copper. The test described in Example IV was employed.

| Inhibitor | Wt. Loss of Specimen (milligrams) | | |
|---|---|---|---|
| | Al | Brass | Cu |
| m-$H_2NCH_2C_6H_4Si(OC_2H_5)_3$ | 2 | 4 | 1 |
| p-$H_2NCH_2C_6H_4Si(OC_2H_5)_3$ | 0 | 2 | 2 |
| None | 40 | 196 | 186 |

Example VI

N,N,-dimethyl-p-aminomethylphenyltriethoxysilane can be produced by dissolving p-aminomethylphenyltriethoxysilane (1 mole) and methyl iodide (2 moles) in ethanol and heating the solution so formed under reflux conditions to cause the starting materials to react according to the equation:

p-$H_2NCH_2C_6H_4Si(OC_2H_5)_3 + 2CH_3I$
$\rightarrow$ p-$(CH_3)NCH_2C_6H_4Si(OC_2H_5)_3 + 2HI$ Sodium ethoxide (2 moles) can be added to the refluxing solution at the rate at which the hydrogen iodide is formed in order to react therewith according to the equation:

$HI + NaOC_2H_5 \rightarrow NaI + C_2H_5OH$

The N,N-dimethyl-p-aminomethylphenyltriethoxysilane so produced can be separated from the reaction mixture by fractional distillation.

Example VII

Into a 300 milliliters stainless steel pressure vessel are charged 58.6 (0.20 mole) of beta-(p-cyanophenyl)ethyltriethoxysilane dissolved in 70 milliliters of ethanol and 3 grams of Raney nickel. The vessel is heated at 100° C. to 125° C. for 3 hours. A pressure of 1700 pounds per square inch is maintained in the vessel by charging hydrogen thereto. The contents of the vessel are filtered and the filtrate is distilled under vacuum. The distilled product is identified as beta-(p-aminomethylphenyl)ethyltriethoxysilane.

Example VIII

When beta-(p-aminomethylphenyl)ethyltriethoxysilane (5 grams) is hydrolyzed and condensed in a solution containing water (5 milliliters) and ethanol (15 milliliters), the solution so produced can be stripped of water and ethanol by heating at 50° C. under reduced pressure to produce a resin which is a siloxane composed of groups having the formula p-$H_2NCH_2C_6H_4CH_2CH_2SiO_{1.5}$.

What is claimed is:

1. An aminomethylphenylsilicon compound selected from the group consisting of:

(A) silanes represented by the formula:

$$(Z_2NCH_2C_6H_4C_nH_{2n})_a\underset{|}{\overset{R_b}{Si}}(OR)_{4-(a+b)}$$

wherein Z is a member selected from the group consisting of the monovalent hydrocarbon groups and the hydrogen atom, $n$ has a value from 0 to 20 inclusive, R is a monovalent hydrocarbon group, $a$ has a value from 1 to 2, inclusive, $b$ has a value from 0 to 2 inclusive and $(a+b)$ has a value from 1 to 3 inclusive and (B) siloxanes composed only of groups represented by the formula:

$$(Z_2NCH_2C_6H_4C_nH_{2n})_a\underset{|}{\overset{R_b'}{Si}}O_{\frac{4-(a+b)}{2}}$$

wherein R' is a member selected from the group consisting of the monovalent hydrocarbon groups and the hydrocarbonoxy groups and Z, $n$, $a$, and $(a+b)$ have the above-defined meanings and $b$ has a value from 0 to 1 inclusive.

2. A silane represented by the formula:

$$(Z_2NCH_2C_6H_4C_nH_{2n})_a\underset{|}{\overset{R_b}{Si}}(OR)_{4-(a+b)}$$

wherein Z is a member selected from the group consisting of the monovalent hydrocarbon groups and the hydrogen atom, $n$ has a value from 0 to 20 inclusive, R is a monovalent hydrocarbon group, $a$ has a value from 1 to 2, $b$ has a value from 0 to 2 and $(a+b)$ has a value from 1 to 3.

3. A silane represented by the formula:

$$(Z_2NCH_2C_6H_4)_a\underset{|}{\overset{R_b}{Si}}(OR)_{4-(a+b)}$$

wherein Z is a member selected from the group consisting of the monovalent hydrocarbon groups and the hydrogen atom, R is a monovalent hydrocarbon group, $a$ has a value from 1 to 2, $b$ has a value from 0 to 2 and $(a+b)$ has a value from 1 to 3.

4. A siloxane composed only of groups represented by the formula:

$$(Z_2NCH_2C_6H_4C_nH_{2n})_a\underset{|}{\overset{R_b'}{Si}}O_{\frac{4-(a+b)}{2}}$$

wherein Z is a member selected from the group consisting of the monovalent hydrocarbon groups and the hydrogen atom, $n$ has a value from 0 to 20 inclusive, R' is a member selected from the group consisting of the monovalent hydrocarbon groups and the hydrocarbonoxy groups, $a$ has a value from 1 to 2, $b$ has a value from 0 to 1 and $(a+b)$ has a value from 1 to 3.

5. The siloxane of claim 4 wherein $b$ has a value of 0.

6. The siloxane of claim 4 wherein $b$ has a value of 1.

7. A siloxane composed only of groups represented by the formula:

$$(Z_2NCH_2C_6H_4)_a\underset{|}{\overset{R_b'}{Si}}O_{\frac{4-(a+b)}{2}}$$

wherein Z is a member selected from the group consisting of the monovalent hydrocarbon groups and the hydrogen atom, R' is a member selected from the group consisting of the monovalent hydrocarbon groups and the hydrocarbonoxy groups, $a$ has a value from 1 to 2, $b$ has a value from 0 to 1 and $(a+b)$ has a value from 1 to 3.

8. A siloxane composed only of at least one group represented by the formula:

$$(Z_2NCH_2C_6H_4C_nH_{2n})_a\underset{|}{\overset{R_b'}{Si}}O_{\frac{4-(a+b)}{2}}$$

wherein Z is a member selected from the group consisting of the monovalent hydrocarbon groups and the hydrogen atom, $n$ has a value from 0 to 20 inclusive, R' is a member selected from the group consisting of the monovalent hydrocarbon groups and the hydrocarbonoxy groups, $a$ has a value from 1 to 2, $b$ has a value from 0 to 1 and $(a+b)$ has a value from 1 to 3 and at least one group represented by the formula:

$$R_c'SiO_{\frac{4-c}{2}}$$

wherein $c$ has a value from 1 to 3 and R' has the above-defined meaning.

9. A siloxane composed only of at least one group represented by the formula:

$$(Z_2NCH_2C_6H_4)_a\underset{|}{\overset{R_b'}{Si}}O_{\frac{4-(a+b)}{2}}$$

wherein Z is a member selected from the group consisting of the monovalent hydrocarbon groups and the hydrogen atom, R' is a member selected from the group consisting of the monovalent hydrocarbon groups and the hydrocarbonoxy groups, $a$ has a value from 1 to 2, $b$ has a value from 0 to 1 and $(a+b)$ has a value from 1 to 3 and at least one group represented by the formula:

$$R_c'SiO_{\frac{4-c}{2}}$$

wherein $c$ has a value from 1 to 3 and R' has the above-defined meaning.

10. A silane represented by the formula:

$$H_2NCH_2C_6H_4\overset{(CH_3)_b}{\underset{|}{Si}}(OC_2H_5)_{3-b}$$

wherein $b$ has a value from 0 to 2.

11. A silane represented by the formula:

$$H_2NCH_2C_6H_4CH_2CH_2\overset{(CH_3)_b}{\underset{|}{Si}}(OC_2H_5)_{3-b}$$

wherein $b$ has a value from 0 to 2.

12. A siloxane composed only of groups represented by the formula:

$$H_2NCH_2C_6H_4\overset{R_b^2}{\underset{|}{Si}}O_{\frac{3-b}{2}}$$

wherein $R^2$ is a member selected from the group consisting of the methyl group and the ethoxy group and $b$ has a value from 0 to 1.

13. A siloxane composed only of groups represented by the formula:

$$H_2NCH_2C_6H_4CH_2CH_2\overset{R_b^2}{\underset{|}{Si}}O_{3-b}$$

wherein $R^2$ is a member selected from the group consisting of the methyl group and the ethoxy group and $b$ has a value from 0 to 1.

14. Para-aminomethylphenyltriethoxysilane.
15. Meta-aminomethylphenyltriethoxysilane.
16. A siloxane consisting essentially of p-aminomethylphenylsiloxy groups.
17. A siloxane consisting essentially of m-aminomethylphenylsiloxy groups.

References Cited by the Examiner
UNITED STATES PATENTS

| | | | |
|---|---|---|---|
| 2,754,284 | 7/56 | Speck | 260—448.2 |
| 2,930,809 | 3/60 | Jex et al. | 260—448.2 |
| 3,033,815 | 5/62 | Pike et al. | 260—448.2 |
| 3,087,909 | 4/63 | Morehouse et al. | 260—448.2 |

TOBIAS E. LEVOW, *Primary Examiner.*

ALPHONSO D. SULLIVAN, SAMUEL H. BLECH,
*Examiners.*